(12) United States Patent
Pertusio et al.

(10) Patent No.: US 6,630,048 B2
(45) Date of Patent: Oct. 7, 2003

(54) PROCESS FOR OBTAINING OR REPAIRING A DIE THAT DOES NOT NEED END FINISHING

(76) Inventors: Julio Eduardo Pertusio, Dorrego 63, $1^{st}$ Floor (8000) Bahia Blanca, Buenos Aires (AR); Jorge Alberto Escudero, Av. De la Reconquista 69, (8000) Bahia Blanca, Buenos Aires (AR)

( * ) Notice: Subject to any disclaimer, the term of this patent is extended or adjusted under 35 U.S.C. 154(b) by 0 days.

(21) Appl. No.: 09/884,485

(22) Filed: Jun. 19, 2001

(65) Prior Publication Data

US 2002/0049295 A1 Apr. 25, 2002

Related U.S. Application Data

(63) Continuation-in-part of application No. 09/150,285, filed on Sep. 9, 1998, now abandoned.

(51) Int. Cl.$^7$ .................. B32B 31/12; C09J 163/00; C09J 183/04; B05D 3/02
(52) U.S. Cl. ............... 156/279; 156/94; 156/150; 156/273.1; 156/273.3; 156/278; 156/307.3; 156/329; 156/330; 106/38.2; 106/36.22; 427/340; 427/373; 427/387; 427/485; 427/486; 427/458; 427/133
(58) Field of Search ............... 249/114.1; 106/38.2, 106/38.22; 427/340, 373, 387, 485, 486, 458, 133; 156/94, 150, 273.1, 273.3, 278, 279, 307.3, 330, 529

(56) References Cited

U.S. PATENT DOCUMENTS

| | | | | |
|---|---|---|---|---|
| 3,838,110 A | * | 9/1974 | Villa | 526/248 |
| 4,070,224 A | * | 1/1978 | Zemlin et al. | 156/314 |
| 4,889,677 A | * | 12/1989 | Hashimoto et al. | 264/297.5 |
| 6,446,933 B1 | * | 9/2002 | Westmoreland | 249/114.1 |

FOREIGN PATENT DOCUMENTS

WO    WO 00/13871    3/2000

* cited by examiner

Primary Examiner—Robert Dawson
Assistant Examiner—Jeffrey B. Robertson
(74) Attorney, Agent, or Firm—Darby & Darby

(57) ABSTRACT

The present invention describes a die to manufacture pieces of plastic materials, molded by injection, projection or blowing processes that does not need end finishing during its construction, and that does not need to employ additional demolding agents during its whole useful life to release the objects molded. Said die is specially useful to obtain pieces of plastic materials that must be painted or must be dealt superficially with the purpose of being employed in various industries, such as the automobile industry, electro-domestic accessories manufacturing, communications, computers, or decoration, etc. This die is also specially useful to obtain pieces that must be adhered in an efficient and substantially permanent way to others as are the soles for the industrial manufacturing of shoes and of sports shoes. There are also described the methods to manufacture or repair the dies, together with a process to prepare the silicon rubber by addition, herein referred to as SRBA, which is modified to be useful in said methods.

18 Claims, 6 Drawing Sheets

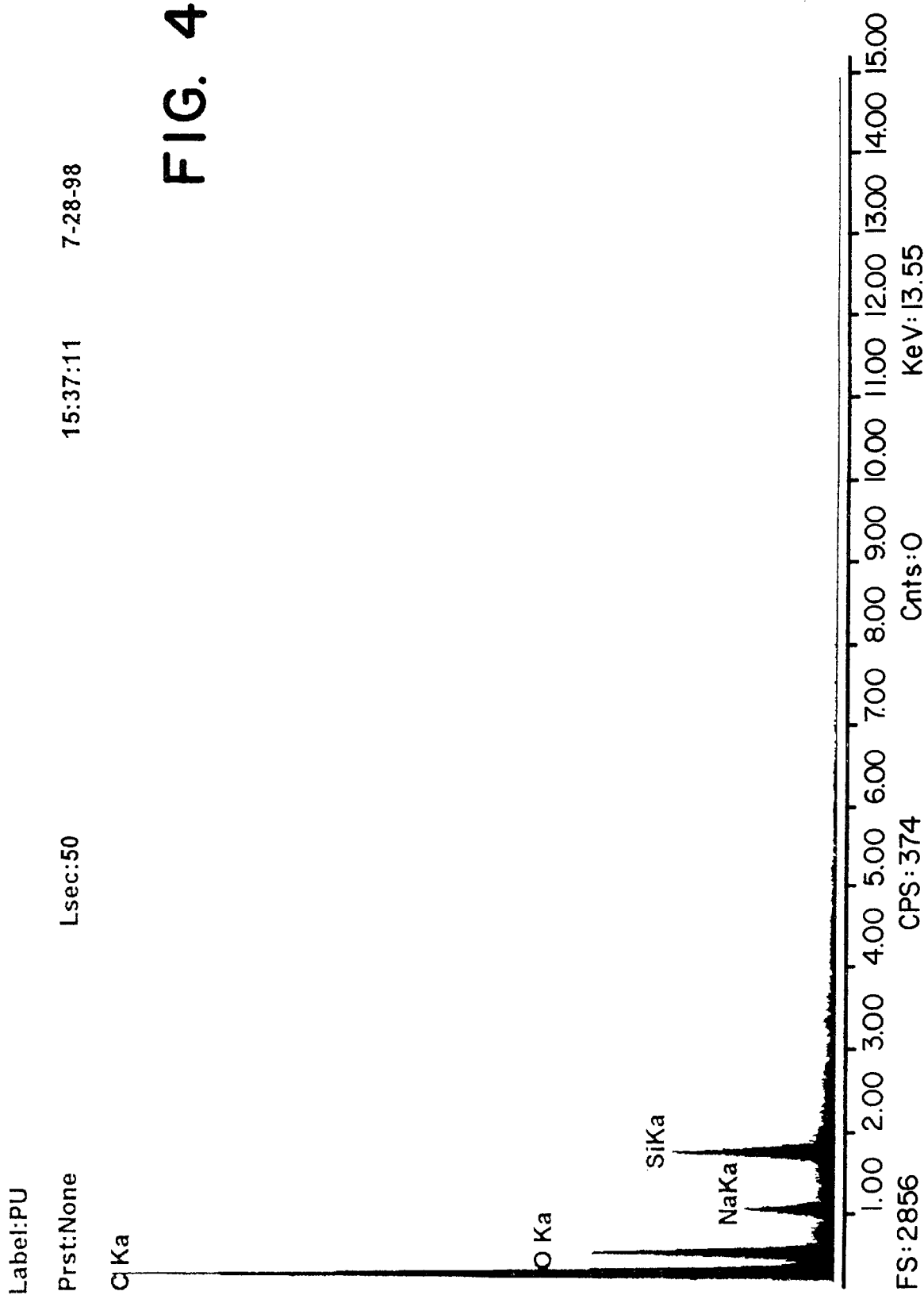

PROCESS FOR OBTAINING OR REPAIRING A DIE THAT DOES NOT NEED END FINISHING

The present application is a continuation-in-part of U.S. patent application Ser. No. 09/150,285, filed Sep. 9, 1998, now abandoned, which is herein incorporated by reference in its entirety.

TECHNICAL FIELD

Die to obtain pieces of plastic materials molded by injection, projection or blowing processes and manufacturing method of said die. There are also provided herein, the methods to manufacture or repair mentioned die, and a process to modify a silicon rubber by addition that will be useful for said processes.

SUMMARY OF THE INVENTION

The present invention describes a die to manufacture pieces of plastic materials, molded by injection, projection or blowing, that does not need end finishing during the construction nor the employment of demolding agents during its whole useful life. The above mentioned die is specially useful to manufacture pieces of plastic materials that need painting in their finishing, or to manufacture those pieces that need to be superficially treated for their use in various industries, such as the automobile industry, electro-domestic accessories manufacturing, communications, computers, or decoration, etc. This die is also specially designed to manufacture pieces that are to be efficiently and permanently bound to others, as are the soles for the industrial manufacturing of shoes and of sports shoes.

The invention also describes the methods to manufacture or to repair the above mentioned die, and the process to prepare a modified silicon rubber by addition, herein referred to as SRBA, that is modified for the purpose of obtaining greater utility for the mentioned processes.

BACKGROUND OF THE INVENTION

The use of demolding agents to manufacture pieces of different plastic materials molded by injection, projection or blowing is known in the art, and those agents may be for internal or external use.

Internal demolding agents are blended in the bulk of the plastic material to be processed, so, the whole compound obtained during this process remains with demolding agent residues on its surface. This makes the article unsuitable to be painted or bound, even if it is submitted to a further complex or very expensive operation, as the demolding agent is also mixed in the bulk of the article.

On the other hand, the external demolding agents, commonly prepared in a silicon basis, have to be directly spread on the die before its use to prevent the pieces from binding with each other during the whole process. Within the pressure and temperature conditions existing during the injection, projection or blowing processes, part of the demolding agent applied to the die is inevitably transferred to the external surface of the article, with a thickness that can be measurable which, therefore, turns difficult the whole removal of the agent.

As a third possibility, we may also mention those materials that, as the polypropylene, do not require the use of demolding agents to be processed, as they naturally reject to be bound to other materials. However, the die and the manufacturing method described in present invention may be useful with these materials if the die of this class is of a less expensive cost than those traditionally used.

Nowadays, the plastic industry has to overcome the problems caused by the presence of the demolding agent, or by the material chosen as raw material, in order to achieve a good painting or a good binding of the injection, projection or blowing molded pieces of plastic materials.

It is not possible to paint or to bind the articles if they are manufactured using an internal demolding agent. The presence of the said demolding agent, or of the raw material, continues with its demolding action and does not allow a good adherence either of the paint or of the adhesive to the manufactured article.

If the pieces are manufactured with an external demolding agent, they must be submitted to a previous process in order to paint them. Those processes are very complex, expensive and contaminate the environment, as for example, the continuous washing with isopropyl alcohol, flamed process, granulated process, etc. These processes, either individually or altogether, have an ambiguous result, as the demolding agent cannot be wholly removed from the surface of the pieces to be painted or bound. That is to say, the residual demolding agent is always present in the manufactured article.

When the articles are manufactured without using a demolding agent, it must be taken into account that they also have to be submitted to various processes to adhere the paint or the adhesive to them. Therefore, pieces are flamed under a controlled flame step, to open the material pores. They are submitted to a crown process, that is to say, a bombardment of their surfaces applying high voltage to obtain the uprising of material microscopic filaments. Therefore, the surface exposed to contact is increased to produce a kind of texture that helps the adherence.

Patent EP 0294043 to Dow Corning, describes a method for molding high water content, low flexible stress, low flame-ability and good supporting load characteristics polyurethane foam articles, wherein a permanent demolding agent is used. A releasing external silicon compound for dies is used to treat the die surfaces. The compound conveys durability features in the die releasing process due to the multiple molding cycles, allowing to cover the die with said compound and so producing such free from defects foam articles. The compound essentially comprises polydimethyl siloxane in blocks ended with high or low molecular weight hydroxyl, a siloxane crosslinking agent having SiH functionality, a catalyst, and an inert solvent.

PCT WO 91-011208 to Robert William Wilson et al., describes an internal demolding agent which is absorbed in a micro-porous carrier, being said carrier afterwards incorporated into the base material, as, for example a plastic material to be molded. The demolding agent is scattered on the base material bulk, making easier the release of the molded component from the mold or die, without a previous spray of an additional demolding agent to said mold or die. Consequently, the molded articles cannot be painted or bound because the action of the demolding material is spread and incorporated in the bulk. The articles obtained by this process exhibit serious adherence difficulties in coating by means of the application of paints over their surfaces.

U.S. Pat. No. 3,838,949 describes a mold that does not need a demolding agent, wherein at least the surface that is in contact with the molding compound includes cured polyester. Said cured polyester contains fluorocarbons prepared from polyepoxy, having an epoxy functionality of about two epoxy groups per mole, and a polymer with a carboxy end.

Said polymers with carboxy ends contain pending allyl or vinyl groups, and wherein at least some of said pending groups are converted into 2-perfluroalkyl-1-iodoethyl, or 3-perfluroalkyl-2-iodopropil groups, to provide a 1 to 40 percent of fluoride content.

U.S. Pat. No. 3,838,110 describes a compound with a mold releasing capacity that may be used as molding compound, or it describes a mold or molding coating in its cured state. It is not necessary to use an additional demolding agent when the compound described is used, which is prepared from (a) polymers ended in carboxy or hydroxy which contain 3-perfluroalkyl-2-iodopropyl or 2-perfluroalkyl-1-iodoethyl pending groups, and (b) polyisocyanate or polyepoxy compounds.

These last two patents have been the first steps taken in the process of manufacturing molds to be employed without the use of any demolding agent; but as they were expensive and they did not achieve good results, they were discontinued. Besides, the Teflon based material was often scratched and torn while, besides, the construction of the dies took a long time to be carried out.

The SRBA was developed and afterwards employed as a permanent demolding agent, but due to its strong resilience and the impossibility of firmly binding it to any stiff element, its use has always been limited to gravity strain molds, as these molds do not resist pressure without distortion.

This difficulty has been largely described and dealt in the art. Repeated attempts have been carried out to combine the SRBA with other materials that could supply the necessary resistance to distortion in a sufficient and necessary quantity to use SRBA in dies manufacture, but these attempts had always faced the difficulty that SRBA does not bind itself to materials used.

This invention has solved this problem, obtaining a proper SRBA thin layer adherence over metals, laminated plastics, or any other element that delivers sufficient mechanical resistance, making possible the use of a new system in the die for plastic injection, projection or blowing processes.

BRIEF DESCRIPTION OF THE INVENTION

The present invention is related to a die construction technique that makes unnecessary the use of any kind of demolding agent during the plastic material processing, which are either of internal or external use. In fact, since the different processes of mentioned materials are known, it has always been necessary the use of agents to prevent the natural adherence to any element that entered into contact with the materials during the process.

This is the cause of a number of problems among which, we can mention, cost increase due to the necessity of adding a demolding agent, waste of time during the manufacture of pieces, failures or brakes during the release of the articles, together with the subsequent damage on dies or molds, and the impossibility of achieving a good painting and/or end finishing adherence of the processed pieces. Industries face similar difficulties when binding the plastic material articles obtained by means of a process of injection, projection or blowing molding, as for example, in the sport shoes manufacturing process.

Taking into account the difficulties that have been described before, and considering that the use of painted plastics is nowadays in constant increase in the industrial field, it is important to remark that during the injection, projection or blowing processes, or during any other similar method carried out to manufacture an article, the presence of demolding agents, under the usual temperature and pressure working conditions, results in the incorporation of said demolding agents into the manufactured pieces. Therefore, we can remark that the above mentioned residual demolding agent does not allow a good finishing adherence of the molded pieces. Consequently, in order to neutralize this difficulty, the industry carries out a variety of operations after the release and before the end finishing layer application, operations that are always very complex and make the product more expensive. In spite of all the measures that are taken in this sense, the quality of the piece end-finishing adherence is deficient. The attempts carried out and the poor results obtained in the automobile industry, regarding the car bodies, are a clear example of what has been mentioned before.

In the present invention, the SRBA continues acting as a demolding agent. But, as it is used as a very thin layer and bound to a stiff substratum that is really the one that keeps the forms, it allows to submit the die at a pressure, which contact surface with the material under process is the SRBA. The result is that the injection die obtained does not need the use of any demolding agent during its useful life.

The die of present invention differentiates from the injection dies that, at present, are manufactured in metal or synthetic resins, because the additional external or internal demolding agents have to be unfailingly used.

The surface of the article obtained, according to present invention, is similar to that of a metal submitted to cataphoresis by the intermolecular bond existing between the base product and the product applied when the first one is painted or bound, as if the paint or the adhesive could diffuse within the surface of the piece, differentiating from the end finishing of the pieces carried out by other processes wherein the paint or adhesive remain floating over the surface of the piece.

It is therefore a first object of this invention, to provide a die to obtain plastic pieces by injection, projection or blowing, not needing said piece final finishing during its manufacturing process nor the use of additional demolding agents during its whole useful life.

A second object of the invention is to provide a process to obtain a modified SRBA; being said modified SRBA useful to manufacture the referred to die.

It is a third object of the invention to provide a process to manufacture said die with said SRBA.

Besides, another object of this invention is to provide an alternative process to manufacture a die using said SRBA, wherein the manufacturing time is substantially shorter.

It is another object of this invention to provide a process to repair a die manufacture according to any of the processes described, taking out by mechanic abrasion or thermal process the two first layers to replace them afterwards employing the corresponding steps of any manufacturing process described above.

BRIEF DESCRIPTION OF THE FIGURES

The characteristics of the invention mentioned above, and others that will be evident herein, will be appreciated in the drawings attached herein, with the aim to provide a detailed and more precise illustration of the invention.

FIG. 4 represents a spectrum obtained by microanalysis corresponding only to the polyurethane.

DETAILED DESCRIPTION OF THE INVENTION

Figure 1:
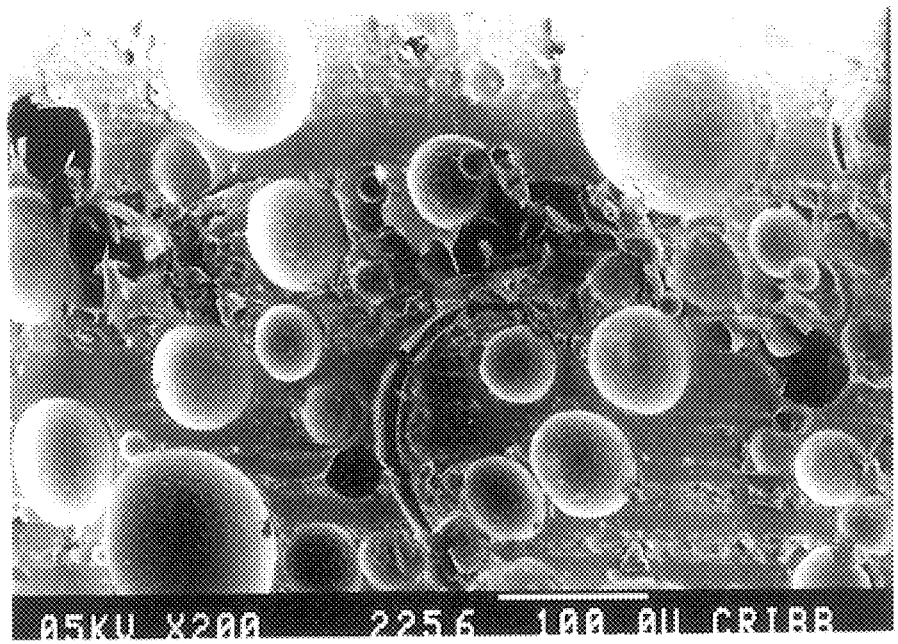
FIG. 1 represents a view of the polyurethane sample topography using the energy dispersion X Ray microanalysis and a scanner electronic microscope.

The term "silicone rubber by addition" (SRBA) herein refers to any kind of di- or mono-substituted polysiloxane that is available under Elastosil, Silastic, Dow Coming, etc., trademarks and that will be chosen according to the material to be contacted during the injection, projection or molding processes. Preferably, silicon rubber compounds used are well known as two component systems. They are silicon rubbers that vulcanize at room temperature (RTV2), wherein the principal component is cured by addition of a second component that may be a catalytic agent for the case of cured type by condensation, or other component for the case of cured type by addition.

The manufacturer of each one of the SRBA that are commercially offered supplies the specific curing agents that must be added to the principal compound in specific quantities. Therefore, it is not possible to make a specific description of the kind of curing agent and of the quantities employed by it.

Typically, polysiloxanes are silicon atom chains bonded in an alternate form with oxygen atoms, having substitutes over the silicon atoms commonly of hydrogen, alkyl, aryl type, etc., and with terminal functioning groups that can be, for example, vinyl groups. These compounds have a great variety of relations among the repetitive unity quantities present in the chains and in the terminal groups, the chains having different molecular weights, according to the commercial product employed. These compounds may show a viscosity from about 10,000 mPa to >1,000,000 mPa.

In a more specific way, the curing of silicone rubbers is generally produced by the union of the methylsiloxane chains ending in vinyl groups with similar chains ending in hydroxy groups, in the presence of a suitable catalyst promoting the reaction. These catalysts are characterized by being organic-metallic catalysts, as the alkyloxy metal group derivatives, such as platinum, tin or titanium, e.g. tetrabutyltitanate, $Ti(OC_4H_9)_4$.

The amounts of catalyst to be used shall depend on rubber-bases and on catalysts used. In general, the amounts added are in the range of about 2% to about 8% by weight. As stated before, the manufacturers of silicone rubber, such as Dow Corning, Wacker, etc., provide the recommended catalyst together with the rubber-base, with an indication of the approximate amount to be suitably used in each case.

In the present application, the term "silicon rubber by evaporation", hereinafter as SRBE, refers to a polysiloxane compound class, generally, polydimethyl siloxanes with hydroxy groups in their chains, including a polymerizing catalyst with an inhibitor. These three compounds, the rubber base, the catalyst, and the inhibitor are commercially available in the form of a unique mass, as for example, Silastic. When the compound is exposed to room humidity, the inhibitor is attacked starting a polymerizing reaction releasing acetic acid. Preferably, the polydimethylsiloxane compound may be an $\alpha,\omega$-hydroxy polydimethylsiloxane.

In the present application, the term "silicone oil" refers to a di- or mono-substituted low molecular weight polysiloxane, of low density and viscosity, eventually dissolved in a proper dispersing agent. They are commercially available while being identified with their generic name.

In the present application, "alveolar materials", as their name indicates, are materials having in their mass a large number of small cells (alveolus=small cell) as bubbles in a liquid. Said materials can be natural ones, such as pumice stone or, in general, different types of volcanic lava, the so called meerschaum, etc. They can be also synthetic materials such as foam polystyrene or, more widely known, the foam polyurethane in its three forms, namely, a) soft, as used for filling seats, cushions and pads in general; b) semi-rigid, as used in a wide variety of solid articles; and c) rigid, as used mainly as thermal isolators or central elements in sandwich structures, etc.

Both natural and synthetic alveolar materials can be classified into two groups:

(1) those having closed cells or alveoli, i.e. which remain stable and without any communication to the exterior and enclosing the gas from which they have been originated; they are called closed cells; and (2) those having open cells or alveoli, which during the formation process break the extremely thin membrane separating one cell from the other at their points of contact, whereby such cells then communicate one to the other and to the exterior; they are called open cells.

For the purposes of this invention, reference will be herein made only to the open cell alveolar materials (which are therefore permeable to silicone rubber, on the one hand, and to resins, on the other hand), which have an adequate mechanical resistance or strength (the soft and semi-rigid ones being therefore set aside, together with many rigid ones which fail to meet requirements under this invention).

As an example, pumice stone was the one showing the best performance, higher to other tested boron silicates of volcanic origin. Among synthetic materials, rigid foams continuously appear in the market which are produced from synthetic polymers having very interesting properties, but the continuous advances within this market makes it difficult to refer to one material in particular, which could be then likely to become outdated.

All the selected alveolar materials are produced in the same manner, namely: (a) they are ground to small particles of no more than about 0.8 mm to about 1 mm diameter; (b) the ground material is then screened by passing it through two metal mesh where the orifices of the first mesh should be twice the thickness of the second layer of SRBA applied on the master, in the alternative process II proposed for producing the die. The second mesh should be about $\frac{3}{2}$ the thickness of the said second layer. Particles are set aside when (A) they fail to pass through any mesh, (B) they pass through both meshes. Particles are selected when they pass the first mesh and fail to pass the second mesh, as having the most adequate size because, when placed on the still uncured second SRBA layer, their own granular size prevents them from becoming submerged at more than $\frac{2}{3}$ their size and from projecting more than $\frac{1}{2}$ their size.

Regarding "fibers" that can be used in this invention, possibilities are as wide as in the case of alveolar materials, and also with the same limitations, i.e. as to their mechanical strength and adequate configuration. Among others, the following can be cited: natural fibers, such as cane or jute; synthetic fibers, such as glass, kevlar, carbon, etc., regarding their configuration, such fibers should be folded in the direction of the three space planes so that, as in the case of alveolar particles, regardless of the form in which they fall on the second still fluid SRBA layer, they should prevent at least ⅓ of their size from being submerged in order to receive the resin. Within this group, glass fibers are preferred because of their excellent performance-price ratio.

In the present invention, the term "plastic laminate" refers to any plastic material that is available in superposed sheets. Any epoxy, polyester, or phenol type resin available in sheets, with the help of a glass fiber kind support, grass satins or "robing" can preferably be employed as a plastic material. They can be placed one over the others, in a desired or necessary number.

In the present application, the term "metal substrate" refers to any pure metal material or alloy, either hard or smooth according to the use and the size of the die. Preferably, aluminum alloys can be employed, as for example 6061T6 alloy, or steel as for example one of the following: 1010, 1020, 4130, 4340, etc.

Injection, projection or blowing molding plastic pieces using a die, according to the present invention, have the important advantage of not incorporating any demolding agent on the piece surface, not even in small quantities as signs or traces. The pieces manufactured by this process show, at the same time, the best painting and adhesive properties without the need of being submitted to any other previous process before being painted or bound, precisely due to the absence of the demolding agents.

In fact, the incorporation of such demolding agents to the pieces obtained by the injection, projection or blowing of plastic materials, is a highly undesirable and inevitable fact in the state of the art till present times, in spite of the attempts carried out till now to prevent it.

In order to paint or to bind the pieces manufactured in this way, continuous isopropyl alcohol washings, as well as granulating, sandpapering, flaming processes, etc. or the incorporation of adherence agents to the pieces have to be carried out. Any of these steps cause serious difficulties from the industrial point of view. However, in spite of using these previous processes, such painting or binding does not provide satisfactory result in all the cases, and the finished product turns to be more expensive.

Therefore, in the traditional processes there is in the plastic material surface a miscible thickness section usually contaminated with the residues coming from the demolding agents which cannot be completely removed and that effectively waterproofs the product before being painted. This results in lowering the paint coating quality of the finished article. As it will be understood, the diffusion process is essential for the adherence of the paint and depends on the way the surface is prepared.

The die to manufacture plastic articles by plastic material injection, projection or molding, object of the present invention, exhibits important advantages compared to the traditional die, as for example:

achieving an important cost reduction in the construction of the die, as the final polishing that the traditional die needs is not necessary any more;

using of precision machinery or high qualified working personnel during the process of manufacturing is not necessary anymore; and repairing of the die as disclosed in the present invention is a new one and at a very low cost.

The die, object of this invention which does not require final finishing during its construction, neither additional demolding agents during its whole useful life, is formed of three different consistent layers:

a) a first layer of a consistent permanent demolding agent, which comprises a modified SRBA to decrease its viscosity to help the formation of blisters, therefore improving its adherence;

b) a second transition layer strongly adhered to mentioned first layer; and c) a third layer strongly adhered to said second layer formed by a substratum with the sufficient mechanical resistance to support the process of filling the die by injection, projection or molding, being said substratum selected from a metallic substratum and a plastic laminate.

Said layers are placed in a special order, from inside to outside, meaning by inside that part of the die that is in direct contact with the material of the piece to be processed by it.

On the other hand, the SRBA employed in the layer a) of the above mentioned die has been modified according to the following process, which comprises:

i) submiting SRBA to a treatment with pure water obtained by distillation or another method, for example, reverse osmosis in about 1% and about 8% of starting SRBA volume at high temperature, preferably between about 60° C. and about 80° C.;

ii) homogenizing the above mentioned blend and adding silicon oil in about 1% to about 10% from the starting SRBA volume;

iii) adding to the blend of above mentioned step ii) between about 0.2% and about 4% in volume regarding the starting SRBA of an organic peroxide acting as strong oxidizer, as for example ketone ethylmethylperoxide;

iv) adding acetic acid from about 0,2% to about 4% of starting SRBA volume; and v) carrying out catalysis taking into account that this step takes place only at the time of being used, otherwise, the material would become harder at the wrong time.

The process of present invention to obtain the above mentioned die in its different forms, provides also an important saving on demolding costs, as demolding agents are not used any more. The process to obtain the die using the above mentioned modified SRBA includes the following steps:

I) Heating the modified SRBA according to the mentioned process, at a temperature ranging from about 30° C. to about 70° C., with mechanical stirring; catalyzing the blend of former step in the traditional way according to the SRBA used, employing the specific catalyst for the SRBA type used.

II) Spreading said modified and catalyzed SRBA over the pattern, masterpieces, or form to be copied by an adequate process with the aim of controlling and adjusting the thickness at the desired value.

It must be taken into account that the way of spreading the SRBA over the pattern must be adequate, as for example, by means of a comb of required dimensions or by means of an electrostatic sprinkled kit.

When the reaction of SRBA is such that it has completely lost its fluidity, which depends on the rubber base, on the catalyst employed and on the working temperature, a quantity of air cells will be observed, that had been trapped in the blend that is partially solidified.

Preferably, the rubber is used at temperatures higher than about 30° C., but lesser than about 70° C., as the material does not complete its cure at temperatures lower than about 30° C., and very few blisters are obtained at temperatures higher than about 70° C. in the final bulk.

A quantity of about ¾ of the total of these cells is surrounded by the compact SRBA, as the remaining ¼ shows a very thin thickness membrane that separates them from the exterior.

III) Break the membrane that separates the superficial cells from the exterior with a suitable element.

The membrane must be broken with an appropriate element as for example a hand, a spatula or a roller of an adequate material, as for example a metal alloy, making it roll, or tighten and rise over the surface. The purpose of this process is producing a unitary smooth surface with a high contacting surface by breaking the external walls of the superficial bubbles.

IV) Spreading a second layer of transition material to provide adherence between the first and the next layer that includes a felt, which is covered with SRBA in one of its faces, equal to the SRBA exposed surface, the felt face and the SRBA exposed face are put in contact, impregnated with SRBE and the air confined therein is taken out. And, V) Binding the uncovered felt face to a substratum selected between a plastic sheet and a metal by an epoxy resin.

In a first embodiment, the second layer that provides the adherence or binding between the before mentioned first and third layers, consists of a felt. Once applied the above mentioned first layer, a lapse of time is allowed to pass for the vulcanization of the modified SRBA layer, said lapse of time will depend on the SRBA used. Said layer is applied as it was explained before and next the blisters are mechanically broken over the SRBA free surface. The silicon blend reaction process rate, with its catalyst, is adjusted so as the loss of cells by spontaneous blowout is not very important.

The second layer consists of a felt that is applied over the first SRBA layer covering one of its faces (that will be put in contact with a SRBA of the first layer that has been already solidified and with their cells broken) with a silicone rubber by evaporation or SRBE, and applying it over the free surface of SRBA, which is also coated with SRBE and the air that could be confined between the first SRBA layer and the felt, for example, is removed by means of running the suitable rollers on the felt to remove the sealed blisters out of the piece. Next, the SRBE sealed between the SRBA layer and the felt is allowed to evaporate through the felt.

In order to form the third layer that is constituted by a substratum with sufficient mechanical resistance, the uncovered face of the felt is bound to the chosen substratum with an epoxy resin, which, as it was mentioned above, is selected among a plastic laminate and a metal compatible with the injector machine to be used.

In a second embodiment of present invention, said second layer includes a binding material selected among open cell alveolus material of about 0,8 mm particle size diameter and natural or synthetic fibers of adequate forms.

There is an alternative process to obtain the above mentioned die in different forms, using the above mentioned modified SRBA, the process comprising the following steps:

I) heating the modified SRBA according to the above mentioned process at a temperature ranging from about 30° C. to about 70° C., by carrying out mechanical stirring and catalyzing;

II) spreading the before mentioned modified SRBA over a pattern, masterpieces, or form to be copied through an adequate process with the aim of controlling and adjusting the thickness at the desired value; and leaving it to solidify;

III) spreading a catalyzed SRBA second layer over the free surface of SRBA of step II) once it solidifies and, over this last one, spreading a binding transition material, without coagulating, to supply adherence between the first and the next layer; said material being selected between an open cell alveolar material and natural or synthetic fibers with adequate forms;

IV) allowing the second layer of SRBA to coagulate and to remove the binding material that is not adhered to it; and V) binding the uncovered face of the adhered binding material to the second coagulated SRBA layer to a substratum selected between a plastic sheet and a metal by an epoxy resin.

It is intended that the first layer of modified SRBA that will be in contact with the object to be molded, has a thickness as thin as possible and that the materials employed allow it. Preferably, the thickness of this first layer is from about 0.1 mm to about 0.7 mm. Generally, the thickness of the two first layers taken together is from about 0.7 mm to about 1.5 mm.

Although the material of this thin first layer could be deformed, its deformation rate is known and, therefore, the deformation of this layer during the molding process, which injection pressure is also known, may be calculated to properly dimension the die according to the measure of the finished piece to be molded, taking into account the tolerances accepted in said measures.

Although different kind of fibers may be used, the glass fiber is preferred, due to its features, among which its high mechanical resistance is remarked. Regarding the forms of the said fibers, they have to be such that when placed over the second SRBA layer, said fibers remain not completely submerged into said SRBA.

Alternatively, said SRBA second layer is applied over the SRBA first layer, which has been previously catalyzed and its thickness has been controlled. Immediately, former chosen binding material is projected over it as previously described. Next, this second layer is completely vulcanized and the not adhered material is removed. Finally, the third layer is bound with an epoxy resin to a substratum selected between a metallic substratum and a plastic laminate compatible with the injector wherein the die is to be used.

Two large element groups can be used as transition material for the adherence in this second embodiment with the former proposed purpose, as follows:

A) alveolar materials, of open cell, with sufficient mechanical resistance, which can be reduced to the proper size, for example, powdered pumice stone. These alveolar materials have to be ground and afterwards selected passing them through a lay wire mesh from about 0.6 mm to 0.8 mm, in order to separate from the whole those particles that are useful due to their granular size; and B) fibers of short forms and adequate resistance, as have been previously described.

This alternative process described has the advantage to be carried out in a much shorter term than the one described before. Both processes may be employed to manufacture the die of present invention and, besides, both methods may be employed to repair the dies that suffer some damage during the process of manufacturing pieces of plastic materials, the second process is preferred as a repairing method, as it needs a shorter time to carry out the reparation compared with the first one.

Dies being constructed according to some of the process described are very easily repaired by the following steps:

a) The two first layers of the damaged die are taken out employing different processes, for example, mechanic abrasion, treatment by temperature, chemical aggression, etc. The selection of the process will depend upon the kind of material of the third layer, of its relative thickness, etc.

b) After this, the same process carried out to start manufacturing must be used, by employing one of the above mentioned alternative systems.

Steps I, II, III and IV of both processes already described, as they are carried out over the master or pattern to be reproduced, may be carried out at the same time the die that was constructed from said same model is still in use. This remarkably accelerates and makes easier the repairing process. The repairing process can be completed by step V of both descriptions, which, in most cases, may be carried out without demolding the die to be repaired from the injector that is being used, (the volume of the master with the two layers over it is only a bit larger than each one of the pieces commonly released).

Without being tied to a particular theory, it is believed that as the SRBA is strongly adhered, there does not exist any silicon transfer from the die into the pieces that are being molded, injected or projected in it. Therefore, the piece remains with the surface wholly clean and free from any demolding agent trace that will prevent its painting or binding. The following examples illustrate the forms in which the invention can be carried out without considering that they limit the scope of the invention.

In particular, it must be added that different kind of raw materials can be used to obtain plastic pieces, molded by injection, projection or blowing, employing a die according to present invention. These substances, used as raw materials, may be polyester resins formulated to obtain pieces with different physical and chemical final characteristics, polyurethane resins for injection process, autospreading polyurethane resins for RIM process, and two compound polymeric resins (base and crosslinking) of SRS type (Structural Resin System) for aspersion molding process, styrene butadiene acrylonitrile thermoplastic polymers (ABS) thermoplastics polymers, etc. In general, for the pieces to be molded, any kind of material chemically compatible with the silicon rubber surface that acts as demolding agent in the die, can be used as a raw material, according to what has been described before and with which said demolding agent is effective as such.

EXAMPLES

Example 1

This example illustrates the way the modified addition silicone rubber (ASR) was obtained.

A viscous ASR, RTV-M 4503 (M533) from Wacker S.A. was taken as a best rubber, and it was vigorously shaken in its own container for 10 minutes, in order to neutralize the natural tendency of these products to settle their heavier components during long periods of rest.

After letting it rest for 30 minutes in a large shallow vessel, thereby removing the enclosed air, 800 $cm^3$ thereof were metered. Every 5 minutes air was injected through an air gun, at a pressure of 50 poun/sq. inch to help the outcropping bubbles burst. To this rubber, which had been previously heated to 60° C. to facilitate its stirring and homogenizing, 24 $cm^3$ of distilled water at 80° C. was added and carefully stirred. 16 $cm^3$ Silicone Oil was then added (also from Wacker) and the resulting mixture was stirred. Thereafter 4,8 $cm^3$ methylethylketone peroxide was added to that mixture with stirring. Finally, 4 $cm^3$ acetic acid was added to this mass and completely homogenized, as in preceding cases.

As a result of this process, a modified ASR was achieved under the appropriate conditions to be used in the following examples.

Example 2

The following example illustrates the way a die was built according to one of the embodiments of the present invention.

A—A master die was selected, which master die had a number of released drawbacks such as:

1—Removal between essentially parallel sides of the die at the braces.

2—High definition detail zones with very low relief in the name area and identifying member number.

A thin coating of Vaseline was applied on the master die, using a wipe to remove the surplus on the planar surfaces and a brush in much more detailed zones. The modified ASR was then heated according to the above Example 1 while checking to make sure the temperature was 65° C. 52 $cm^3$ of T 35 catalyst from Wacker was used and it was mixed by means of an instrument driven by a hand drill spinning at 1,250 rpm, which had been made ad hoc.

Said instrument comprised two inverted screws mounted on the same shaft, such that the upper screw would generate a downward stream and the lower screw would produce a stream in the opposite direction. This guaranteed a perfect mixing, as well as the appropriate formation of bubbles. The modified catalyzed ASR was then poured onto one of the sides of the master die as a small stream dispersed all over the side exposed thereto. Thereafter, the thickness of the ASR was checked by passing a flexible polyethylene comb with the suitable section on the entire surface of the master die, removing the excess and pushing it off the piece. The high self-leveling power of ASR made the marks left by the comb quickly disappear, causing the exposed side of the master die to have a layer of about 4/10 of a mm ASR over its entire surface. It was noted that, during the time elapsed up to the complete vulcanization of ASR, the bubbles therein enclosed desirably rose to the surface. Then, the bubbles were burst by means of a planar rubber roller, with bubbles appeared completely surrounded by vulcanized ASR.

B-Then, an evaporation silicone rubber (ESR) was used, silicone 600 from Bayer S.A. was used. It was spread with the help of a spatula all over the vulcanized ASR, carrying out the same operation over one of the sides of the appropriate felt, which was then placed on top of the ESR applied on the vulcanized ASR, such that both faces were in contact with the ESR.

All the air enclosed therein, was then removed by repeatedly passing a suitable roller thereon, thus also pushing the surplus of ESR off the piece.

The ESR was left to set through the felt, and the clean side of the felt was soaked in a suitably catalyzed epoxy resin.

C-Rolling with a roving and fiberglass felt was continued as is usual in the art, until the right thickness for the application the die would be used for same procedure was carried out with the other side of the master die, and so on, until it was completed.

Example 3

This example shows how a die according to a further embodiment of the present invention was achieved.

The same procedure as disclosed in Example 2, part A was carried out, until the first layer of modified ASR becomes completely vulcanized.

A second layer of ASR was then applied onto the first one in the same manner described in the above Example 2, except that, as soon as the thickness control comb had been passed and the surface was leveled, powdered pumice of a particle size of about 0,7 mm diameter achieved by using suitable screens, is spread thereon.

Once this second layer of ASR had completely vulcanized, unattached particles were removed from the surface by using air injection and the surface soaked in epoxy resin and applied to a previously degreased metal surface that had been treated with an abrasive disc to make it more stringent.

Example 4

Finally, various products were obtained by using the dies made in the above Examples 2 and 3. The procedures used for obtaining these products were the usual ones in the art, with the important proviso that no release agent was used.

The products obtained from these release agent-free dies were submitted to multiple laboratory tests wherein, e-g, total adherence of the paint or finishing applied thereon proved to be satisfactory.

One of the tests carried out consisted of scraping a painted piece with a machine comprising a mobile arm, at one end of which a blade was securely attached, perpendicularly to the surface of the piece.

This machine also served to meter the pressure exerted on the piece by the blade, which pressure is variable at the operator's discretion, as well as the number of scraping cycles performed on the surface by the mobile arm. After carrying out sequential tests performed using different pressure values on the piece, a similar result was achieved in every case, i.e., the blade wore the paint out without detaching it form the piece.

The test method used was D 51-1755, applied by the "Regie des Usines Renault".

Another test performed was D 24 1699 from the "Regie des Usines Renault", which consisted of bombarding the surface of a painted piece with small steel balls at variable speeds of up to 250 km/hour, without being able to distinguish any paint peeling off, or any star markings caused by the impacts thus produced.

These test clearly demonstrated that the product thus obtained and then painted has improved anchorage properties in the paint coating, such properties being much better than the ones exhibited by painted products achieved according to the previous art, i.e., by using additional internal or external mold release agents.

Example 5

In order to perform this test a Philips PW 1400 X-Ray Fluorescence Spectrometer with rhodium anode, LiF, PE TLAP crystals was used, running at 60 Kv and 40 mAmp, with Flow and scintillating sensors, both in air and vacuum atmosphere. Through this procedure, it is possible to identify chemical elements comprised between sodium and uranium.

Two polyurethane test tubes were analyzed, a painted one and an unpainted one. Both the surface and the inside of the sample were analyzed in both cases. The test was carried out after washing the samples with ethanol, which samples were then directly exposed to radiation.

In the unpainted sample, silicon was identified both inside and out, although no significant differences were qualitatively found between both contents.

In the painted sample the following elements were found: iron, copper, nickel, zinc, magnesium, sulfur, titanium, barium, strontium, lead, silicon and chlorine. The elements with the highest ratio of appearance were titanium and barium.

Scanning Electron Microscopy and Energy Dispersion X-Ray Microanalysis

An JEOL 35 CF Scanning Electron Microscope was used with an EDAX Microanalysis System, Si sensor (li) with UTW window, detecting elements from boron to uranium present in amounts higher than 0,1 weight %.

Sections were performed in areas pertaining to polyurethane (PU), paint and the area close the interface therein between. Sections were placed on graphite sample holders. The sections of interest were placed perpendicular to the surface of the sample holder for its surveillance and later microanalysis. The surfaces were covered with a coal coating (necessary for its surveillance and later microanalysis).

Figure 2:
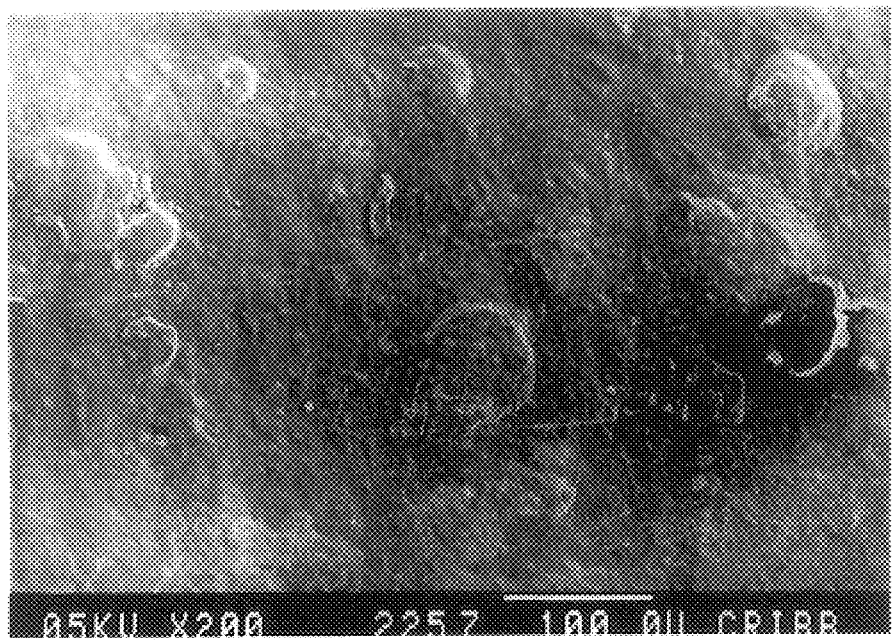
FIG. 2 represents a view similar to FIG. 1, but depicting the topography corresponding to a paint layer applied over the former polyurethane sample.
Figure 3:
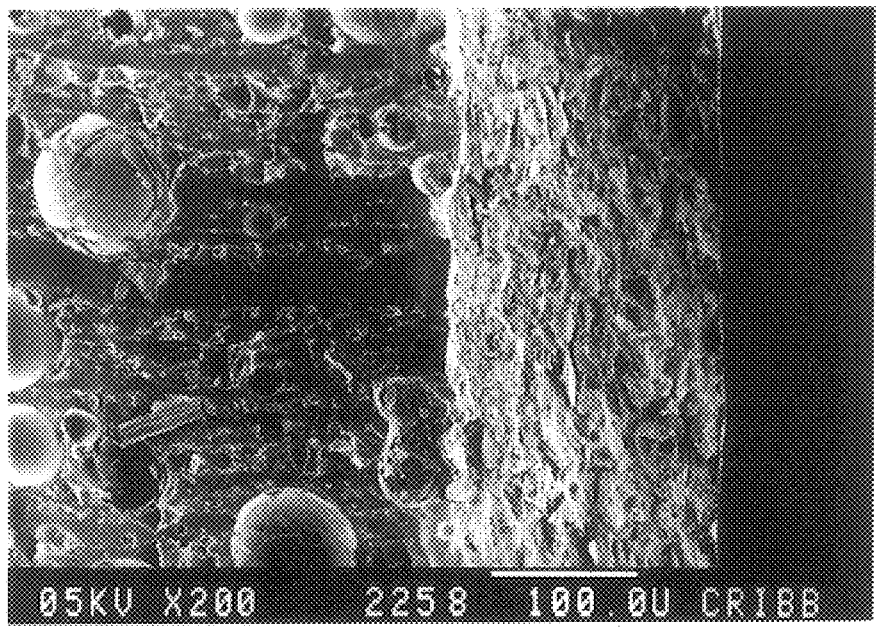
FIG. 3 represents a view of same former characteristics, but in this case making focus in the zone corresponding to the interface between the polyurethane bulk and the paint applied over it.

Observations of the topography of the sample designated as PU (polyurethane) were carried out, which topography is shown in FIG. 1, and the one designated as paint, FIG. 2, to establish their location in the sample containing the interface represented by FIG. 3.

The microanalysis spectrum for each region is shown below. The spectrum shown in FIG. 4 corresponds to PU alone. The presence of C, O, Si and Na was detected therein.

Figure 5:
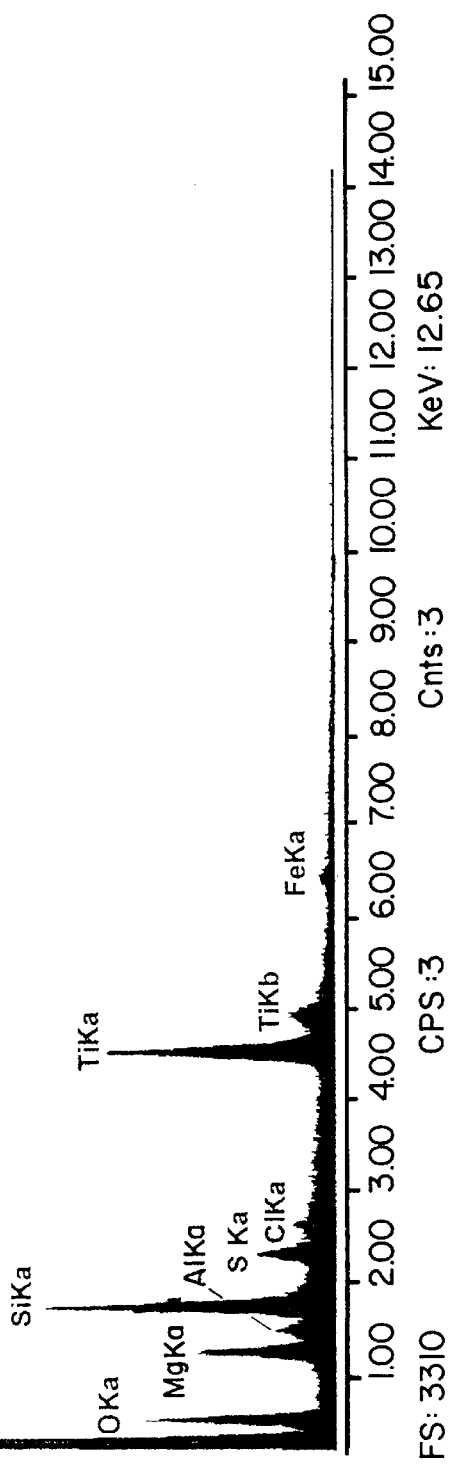
FIG. 5 represents a spectrum obtained by microanalysis of the paint applied over the polyurethane.
Figure 6:
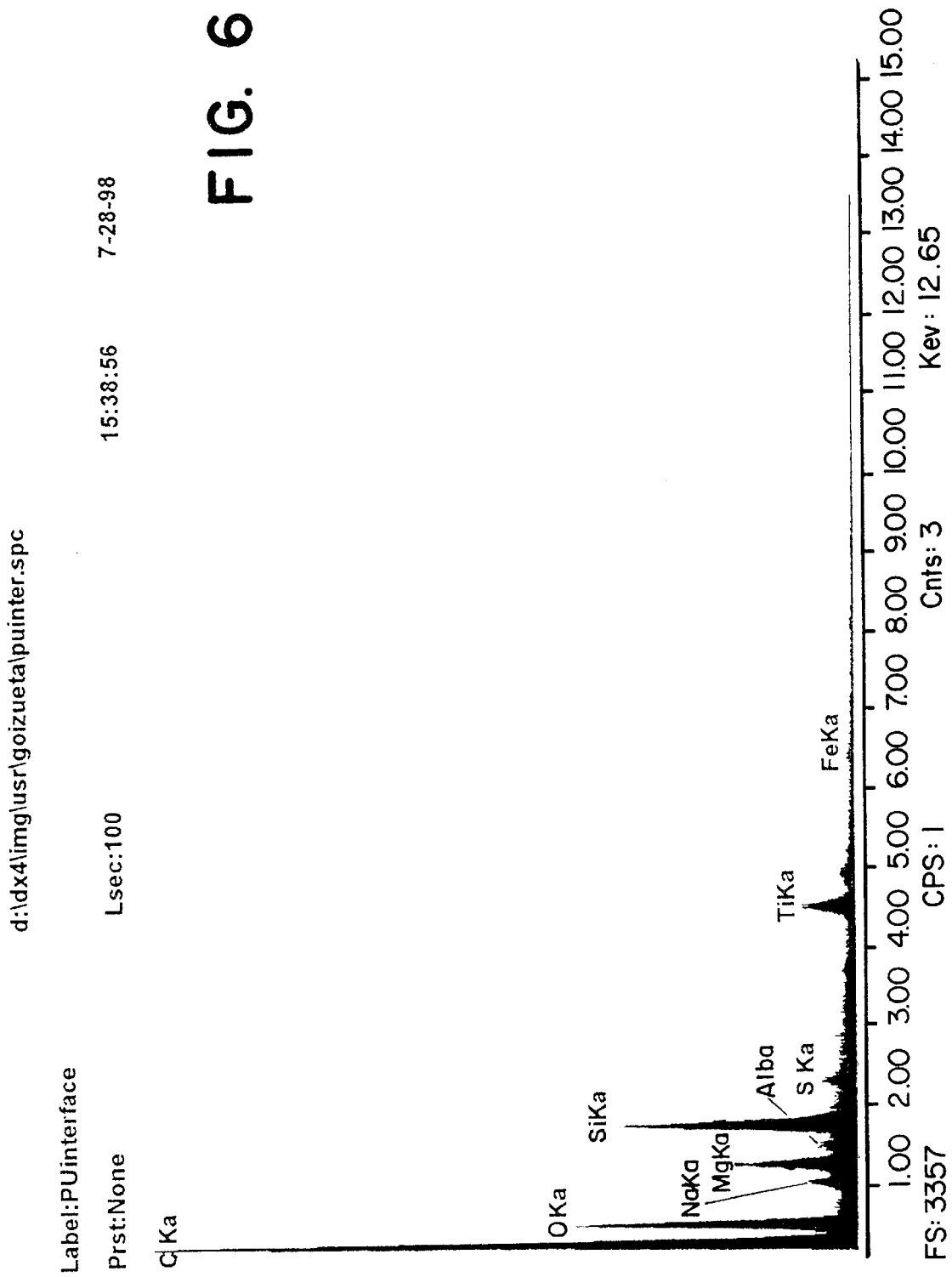
FIG. 6 represents the spectrum obtained by the microanalysis of polyurethane interface zone/painting.

The spectrum shown in FIG. 5 shows the results achieved when analyzing paint. The following elements were detected: C, O, Mg, Al, Si, S, Cl, Ti and Fe.

The spectrum shown in Figure is the one obtained in the PU-paint interface.

Figure 7:
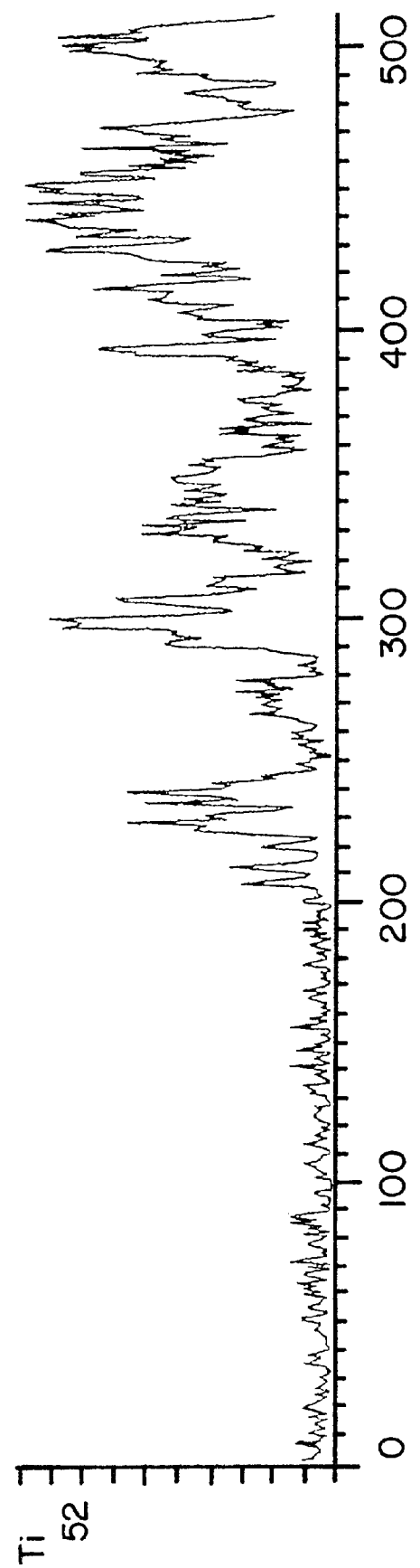
FIG. 7 depicts the intensities corresponding to titanium, which range between line 0 and 512 is showed in former FIG. 3.

Since Ti is the element with the highest signal, a follow-up of same was performed in the sample pertaining to the PU-paint interface, as shown in FIG. 3. In FIG. 7 there are depicted the Ti intensities along a tested line, which was quantified between 0 and 512 points. It was seen that from about 200, corresponding to a point located inside PU, Ti begins to be detected.

Figure 8:
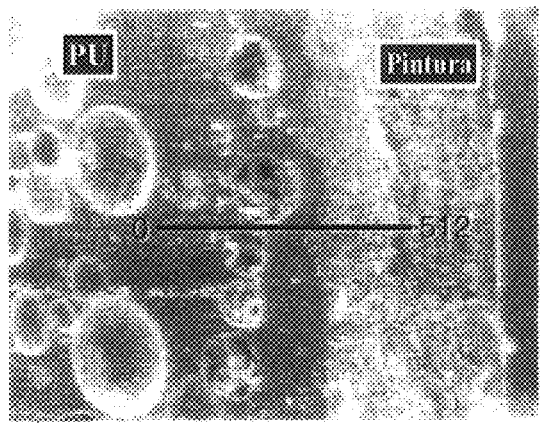
FIG. 8 represents titanium mapping in the same interface considered in former figures.

In the picture depicted in FIG. 8 there is shown a mapping of Ti performed on the above interface zone. In the painted area there is a higher concentration of points corresponding to such element. However, in one of the PU pores it was possible to observe said element in significant amounts. Similar results were obtained in further samples of the assayed interface.

Conclusions

The X-Ray fluorescence assay indicates that there are no significant differences between the silicon contents within and on the surface of the test tube being tested. In other words, no significant amounts of silicon compounds are detected on the surface of the test tube subjected to this assay.

In the Scanning Electron Microscopy (SEM) and X-Ray Microanalysis titanium was detected in the region close to the layer of paint, corresponding to PU. This is clear evidence that the paint has penetrated into the PU test tube.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

It is further to be understood that all values are approximate, and are provided for description.

Patents, patent application, publications, product descriptions, and protocols are cited throughout this application, the disclosures of which are incorporated herein by reference in their entireties for all purposes.

We claim:

1. A process for obtaining a die that does not need end finishing during its construction, and that can be used in absence of additional demolding agents, the process comprising the steps of:

i) making a homogeneous blend by treating a starting volume of silicone rubber by addition (SRBA) with a volume of water that consists of about 1 percent to about 8 percent of the SRBA starting volume at a temperature that ranges from about 60° C. to about 80° C.;

ii) adding to the blend of step i) a volume of silicone oil of about 1 percent to about 10 percent of the SRBA starting volume, while homogenizing;

iii) adding to the blend of step ii) a volume of organic peroxide of about 0.2 percent to about 4 percent regarding the SRBA starting volume, while homogenizing; and iv) adding to the blend of step iii) a volume of acetic acid of about 0.2 percent and to about 4 percent regarding the SRBA starting volume, while homogenizing to produce a modified SRBA;

v) heating the modified SRBA at a temperature ranging from 30° to 70° C., while mechanically stirring and adding a suitable catalyst in a suitable amount regarding the used SRBA, wherein after heating, the modified SRBA begins to harden and air cells form;

vi) applying said modified SRBA according to step v, over a pattern, masterpieces, or form to be reproduced controlling the thickness, thereby forming a first layer of SRBA wherein air cells migrate to an external surface of the modified SRBA;

vii) allowing to solidify the modified SRBA of step vi;

viii) breaking the external air cells in the modified SRBA that is already solidified;

ix) applying a second transitional material layer over the whole exposed face of the modified SRBA already solidified, said material consisting of a felt onto one side of which together with the exposed SRBA surface are covered with silicone rubber by evaporation (SRBE), while pulling out the air present between said felt and said SRBA surface while putting them in contact; and x) binding the uncovered face of the felt to a substratum with an epoxy resin; said substratum being a member selected from the group that consists of a plastic laminate and a metal, said substratum being the link between the first layer of SRBA of the die and the injection, projection or molding machine wherein said die is used.

2. A process according to claim 1, that includes applying the modified silicone rubber by addition (SRBA) by means of an electrostatic sprinkled kit.

3. The process according to claim 1, that includes heating the modified silicone rubber by addition (SRBA) at a temperature that ranges from about 50° C. to about 70° C.

4. The process according to claim 1, further including the step of eliminating the first SRBA layer and the second transitional material layer of the die after these two layers have become damaged so as to repair the die after damage thereto.

5. The process of claim 1, wherein said organic peroxide is ethylmethylketone peroxide.

6. The process of claim 1, wherein said silicone rubber by addition (SRBA)catalyst is tetrabutyltitanate.

7. A process to obtain a die that does not need end finishing in its construction and that can be used in absence of additional demolding agents, the process comprising the steps of:

i) making a homogeneous blend by treating a starting volume of silicone rubber by addition (SRBA) with a volume of water that consists of about 1 percent to about 8 percent of the SRBA starting volume at a temperature that ranges from about 60° C. to about 80° C.;

ii) adding to the blend of step i) a volume of silicone oil of about 1 percent to about 10 percent of the SRBA starting volume, while homogenizing;

iii) adding to the blend of step ii) a volume of organic peroxide of about 0.2 percent to about 4 percent regarding the SRBA starting volume, while homogenizing; and iv) adding to the blend of step iii) a volume of acetic acid of about 0.2 percent and to about 4 percent regarding the SRBA starting volume, while homogenizing to produce a modified SRBA;

v) heating the modified SRBA at a temperature ranging from 30° to 70° C. while mechanically stirring the modified SRBA, and adding a suitable catalyst in a suitable amount regarding the used SRBA;

vi) applying said modified SRBA of step v) over a pattern, masterpiece, or form to be reproduced controlling the thickness, with the aim of forming a first catalyzed SRBA layer;

vii) applying a second catalyzed SRBA layer over the surface of the SRBA of step vi), once the first layer is solidified;

viii) applying a transitional binding material over the second layer before the second layer coagulates;

ix) allowing the second layer of the SRBA to coagulate and to remove the transitional binding material that is not adhered from said layer; and x) binding the uncovered face of the binding transitional material adhered to second layer of the coagulated SRBA to a substratum by applying an epoxy resin to said transitional binding material; the substratum being a member selected from the group consisting of a plastic laminate and a metal, said substratum being the link between the first catalyzed SRBA layer of the die and the injection, projection or molding machine wherein said die is used.

8. The process of claim 7, that comprises applying the silicone rubber by addition (SRBA) by means of an electrostatic sprinkled kit.

9. The process of claim 7, that comprises heating the silicone rubber by addition (SRBA) at a temperature that ranges from about 50° C. to about 70° C.

10. The process of claim 7, wherein the transitional material used for adherence includes alveolar materials, and the alveolar materials are obtained by milling and screening with lay wire meshes of about 0.6 mm to about 0.8 mm.

11. The process of claim 10, wherein the transitional material used for adherence is pumice stone.

12. The process according to claim 7, further including the step of eliminating the first SRBA layer and the second catalyzed SRBA layer of the die after these two layers have become damaged so as to repair the die after damage thereto.

13. The process of claim 7, wherein said silicone rubber by addition (SRBA) catalyst is tetrabutyltitanate.

14. The process of claim 7, wherein said organic peroxide is ethylmethylketone peroxide.

15. The process of claim 7, wherein said transitional material used for adherence is selected from the group consisting of open cell alveolar materials, synthetic fibers and natural fibers.

16. The process of claim 15, wherein said open cell alveolar materials are selected from the group consisting of pumice stone and boron-silicates of volcanic origin.

17. The process of claim 15, wherein said synthetic fibers are selected from the group consisting of glass, kevlar fibers and carbon fibers.

18. The process of claim 15, wherein said natural fibers are selected from the group consisting of hemp fibers and jute fibers.

* * * * *